Patented Mar. 27, 1934

1,952,702

UNITED STATES PATENT OFFICE 1,952,702

PROCESS FOR THE MANUFACTURE OF KETONES

Martin de Simo, Berkeley, Calif., assignor to Shell Development Company, San Francisco, Calif., a corporation of Delaware No Drawing. Application January 17, 1931, Serial No. 509,543

11 Claims. (Cl. 260—134)

My invention relates to a process for the manufacture of ketones from corresponding alcohols and more particularly to a dehydrogenation process wherein a zinc alloy catalyst is employed at comparatively low temperatures.

It is well known that the dehydrogenation reaction of secondary alcohols to form the corresponding ketones is catalyzed by metallic copper. Much less known is the use of brass as a dehydrogenating catalyst with respect to secondary alcohols. Williams et al. in U. S. Patent 1,460,876 describes the employment of brass to effect the decomposition of a secondary alcohol to its corresponding ketone at temperatures between 500° and 800° C.

I have found that temperatures from 500° C. and above are unnecessary and disadvantageous in dehydrogenating processes wherein a brass catalyst is utilized to effect the decomposition of secondary alcohols to ketones. At or above 500° C., the rate of decomposition is quite rapid, leading to the formation of olefines and water, which are undesirable products. For example, I have found that in dehydrogenating secondary butyl alcohol at temperatures above 480° C., dehydration of the butyl alcohol is initiated which increases with increasing temperature in the following manner:

| Temperature in °C. | Percent butylene in the reaction gases |
|---|---|
| 480 | 0.4–1.2 |
| 520 | 3.0–3.1 |
| 560 | 5.6–7.6 |
| 600 | 6.6–8.8 |
| 650 | 7.9–8.8 | which shows that at 600–650° C. 6–10% of the total alcohol is lost in the process on account of this side reaction. Besides this loss, there is an additional loss due to the extra expense of extracting the formed water from the reaction products. At the same time as the dehydration reaction starts, butylene begins to decompose to carbon and hydrogen. At 600° C. this third reaction becomes so excessive that the reaction stops, as the carbon formed blocks all the free vapor passages.

Furthermore at temperatures above 600° C. in addition to the above described side reaction of dehydration which leads to the major part of the losses, other reactions occur, mostly of pyrolytic nature, resulting in the formation of aldehydes and acids which contaminate the crude ketone and cause considerable purification difficulties. The purification of the ketone from these products is essential as the latter are highly undesirable.

I have discovered that if vapors of secondary alcohols, in the pure state or in admixture with other components, are passed over a brass catalyst at temperatures from 346° C. to 480° C., undesirable side reactions, as described above, are avoided and larger yields of ketones are obtained, with a maximum yield of ketone effective at about 400° C. (vapor temperature) as illustrated by the following:

| Vapor temperature of dehydrogenation | Percent dehydrogenation effected |
|---|---|
| °C. | |
| 346 | 14 |
| 355 | 21 |
| 366 | 41 |
| 374 | 62 |
| 385 | 90 |
| 397 | 96 |
| 405 | 96 |
| 415 | 96 |

The corresponding temperature of the catalyst is slightly higher than the vapor temperature, and I have determined that the optimum yield is accordingly available at a reaction temperature between 346 and 480° C. but not above this range. Within this range, no or only negligible amounts of side reactions occur while above this temperature, the loss becomes considerable.

While my operative range of temperature is effective with all aliphatic primary and secondary alcohols, I have found that the temperature range of about 370° C.–430° C. is particularly suitable for the dehydrogenation of isopropyl alcohol, secondary butyl alcohol and secondary amyl alcohol.

The term "brass" as employed in the claims comprises any alloy of copper and zinc regardless of its commercial denomination.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. A process for the manufacture of ketones comprising subjecting vapors of secondary aliphatic alcohols to the action of brass at a temperature between 346° C. and 480° C. in the substantial absence of oxygen.

2. A process for the manufacture of methyl ethyl ketone comprising subjecting vapors of secondary butyl alcohol to the action of brass at a temperature of about 370° C. to about 430° C.

3. A process for the manufacture of ketones comprising contacting vapors of secondary aliphatic alcohols with a catalyst consisting essentially of alloyed copper and zinc at a temperature between 346° C. and 480° C. in the substantial absence of oxygen.

4. A process for the manufacture of methyl ethyl ketone comprising contacting vapors of secondary butyl alcohol with a catalyst consisting essentially of alloyed copper and zinc at a temperature of about 370° C. to about 430° C.

5. A process for the manufacture of ketones comprising subjecting vapors of secondary aliphatic alcohols containing from three to five carbon atoms per molecule to the action of brass at a temperature between 346° and 480° C. in the substantial absence of oxygen.

6. A process for the manufacture of ketones comprising subjecting vapors of secondary aliphatic alcohols containing from three to five carbon atoms per molecule to the action of brass at a temperature between 370° and 480° C. in the substantial absence of oxygen.

7. A process for the manufacture of ketones comprising subjecting vapors of secondary aliphatic alcohols containing from three to five carbon atoms per molecule to the action of brass at a temperature between 370° and 430° C.

8. A process for the manufacture of acetone comprising subjecting vapors of isopropyl alcohol to the action of brass at a temperature between 370° and 430° C.

9. A process for the manufacture of ketones comprising subjecting vapors of secondary amyl alcohol to the action of brass at a temperature between 370° and 430° C.

10. A process for the manufacture of acetone which comprises subjecting vapors of isopropyl alcohol to the action of a copper-zinc alloy at a temperature between 346° and 480° C. in the substantial absence of oxygen.

11. A process for the manufacture of ketones which comprises subjecting vapors of secondary amyl alcohol to the action of a copper-zinc alloy at a temperature between 346° and 480° C. in the substantial absence of oxygen.

MARTIN DE SIMO.